United States Patent
Swanke et al.

(10) Patent No.: US 7,212,987 B2
(45) Date of Patent: May 1, 2007

(54) SYSTEM AND METHOD FOR PLANNING A DESIGN PROJECT, COORDINATING PROJECT RESOURCES AND TOOLS AND MONITORING PROJECT PROGRESS

(75) Inventors: Karl V. Swanke, Essex Junction, VT (US); Sebastian T. Ventrone, South Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 1160 days.

(21) Appl. No.: 10/001,686

(22) Filed: Oct. 23, 2001

(65) Prior Publication Data

US 2003/0078826 A1    Apr. 24, 2003

(51) Int. Cl.
G06F 9/46       (2006.01)

(52) U.S. Cl. .................................................... 705/9
(58) Field of Classification Search ............... None
See application file for complete search history.

(56) References Cited

U.S. PATENT DOCUMENTS

| | | | |
|---|---|---|---|
| 4,875,162 A | 10/1989 | Ferriter et al. | |
| 5,548,506 A | 8/1996 | Srinivasan | |
| 5,706,452 A | 1/1998 | Ivanov | |
| 5,761,063 A * | 6/1998 | Jannette et al. | 700/97 |
| 5,761,674 A | 6/1998 | Ito | |
| 5,899,979 A * | 5/1999 | Miller et al. | 705/9 |
| 5,911,143 A * | 6/1999 | Deinhart et al. | 707/103 R |
| 5,950,021 A * | 9/1999 | Suzuki et al. | 396/87 |
| 5,960,173 A * | 9/1999 | Tang et al. | 709/201 |
| 5,978,476 A * | 11/1999 | Redman et al. | 705/51 |
| 6,101,481 A | 8/2000 | Miller | |
| 6,144,955 A | 11/2000 | Tsuiki et al. | |
| 6,161,113 A | 12/2000 | Mora et al. | |
| 6,212,549 B1 * | 4/2001 | Page et al. | 709/205 |
| 6,434,607 B1 * | 8/2002 | Haverstock et al. | 709/217 |
| 6,507,845 B1 * | 1/2003 | Cohen et al. | 707/100 |
| 6,519,763 B1 * | 2/2003 | Kaufer et al. | 717/101 |
| 6,578,006 B1 * | 6/2003 | Saito et al. | 705/9 |
| 6,591,278 B1 * | 7/2003 | Ernst | 707/104.1 |
| 6,604,237 B1 * | 8/2003 | Giammaria | 717/174 |
| 6,622,116 B2 * | 9/2003 | Skinner et al. | 702/183 |
| 6,832,176 B2 * | 12/2004 | Hartigan et al. | 702/178 |

(Continued)

OTHER PUBLICATIONS

Simmons, Dick B. et al., Manager Associate IEEE Transactions on Knowledge and Data Engineering, vol. 5, Iss. 3, Jun. 1993, pp. 305-310.*

(Continued)

*Primary Examiner*—Tariq R. Hafiz
*Assistant Examiner*—Scott L. Jarrett
(74) *Attorney, Agent, or Firm*—Gibb I.P. Law Firm, LLC; Richard M. Kotulak, Esq.

(57) ABSTRACT

A method and structure for coordinating resources to complete a design project prioritizes tasks to create a project plan, automatically notifies resources of task responsibilities and associated due dates based on the project plan through the use of encryption keys, controls access to the design data through the use of the encryption keys assigned to the resources, automatically monitors work being performed on tasks through a computerized network, and automatically notifies a project team leader of task completion status, overdue tasks, and tasks being ignored, based on the monitoring.

17 Claims, 3 Drawing Sheets

U.S. PATENT DOCUMENTS

| | | | |
|---|---|---|---|
| 6,944,622 B1* | 9/2005 | Mitchell et al. | 707/102 |
| 2002/0055832 A1* | 5/2002 | Donelan et al. | 703/22 |
| 2002/0087381 A1* | 7/2002 | Freeman et al. | 705/9 |
| 2002/0162077 A1* | 10/2002 | Jeng et al. | 716/1 |
| 2003/0033191 A1* | 2/2003 | Davies et al. | 705/10 |

OTHER PUBLICATIONS

Hilbert, David et al., An Approach to Large-Scale Collection of Application Usage Data Over the Internet IEEE 20th International Conference On Software Engineering, 1998.*

Hameri, Ari-Pekka, Project Management in a long-term and global one-of-a-kind project International Journal of Project Management, 1997, vol. 15, Iss. 3, pp. 151-157.*

Hameri, Ari-Pekka et al., Distributed New Product Development Project Based on Internet and World Wide Web Jounral of Product Innovation Management, 1997, vol. 14, pp. 77-87.*

Puittinen, Rainer et al., Measuring and visualizing information transfer in networked collaboration International Journal of Communication Systems, 1999, vol. 12, pp. 85-101.*

Simmons, D.B. et al., Software Project Planning Associate (SPPA): a knowledge-based approach for dynamic software project planning and tracking COMPSAC 2000, Oct. 25-27, 2000, pp. 305-310.*

Simmons, D.B. et al., Plan tracking knowlege base Computer Software and Applications Conference (COMPSAC) Oct. 25-27, 2000, pp. 299-304.*

Eloranta, Eero et al., Improved project management through improved document management Computers in Industry, 2001, vol. 45, pp. 231-243.*

Simmons, D.B. et al., Software Mesurement—A Visualization Toolkit Hewlett-Packer Processional Books, Prentice Hall, 1998, ISBN: 0-13-840695-2.*

Pyron, Tim et al., Using Microsoft Project 2000, Special Edition Que, Sep. 2000, ISBN: 0789722534.*

Jaggi, Felix P., An access control model based on time and events The University of British Columbia, 1990, AAT MM63890, Abstract.*

Sanhu, Ravi S. et al., Role-Based Access Control Models IEEE Computer, vol. 29, No. 2, Feb. 1996, pp. 38-47.*

Marshall, Patrick, Beefier Domino.Doc 2.0 shows impressive maturation InfoWorld, Jul. 6, 1998, vol. 20, No. 27, p. 98.*

Automated Project Management Application Brings Exciting New Technology to CRE Managers Business Wire, Mar. 3, 1999.*

Decmyn, Dominique, Novell unveils products in e-commerce push Computerworld, Feb. 14, 2000, vol. 34, No. 7.*

Herzberg, Amir et al., Access Control Meets Public Key Infrastructure, Or: Assigning Roles to Strangers 2000 IEEE Symposium on Security and Privacy, 2000, pp. 2-14.*

GoProject Web Site Jun. 2000, notes.pmla.com, Retrieved from Archive.org Jul. 28, 2006.*

Hung Chak Kuen Patrick, Secure Workflow Model Hong Kong University of Science and Technology, AAT 3029252.*

Thomas R.K. et al., Task-Based Authorization: A Paradigm For Flexible And Adaptable Access Control in Distributed Applications, NIST-NCSC National Computer Security Conference, 1993, pp. 409-415.*

Bertino E. et al., A Flexible Model Supporting the Specification and Enforcement of Role-based Authorizations in Workflow Management Systems, ACM Workshop of Role Based Access Control, 1997.*

Thomas, R,K. et al., Task-based Authorization Control: A Family of Models for Active and Enterprise-oriented Authorization Management, IFIP WG11/3 Workshop on Database Security, Aug. 11-13, 1997.*

* cited by examiner

SYSTEM AND METHOD FOR PLANNING A DESIGN PROJECT, COORDINATING PROJECT RESOURCES AND TOOLS AND MONITORING PROJECT PROGRESS

BACKGROUND OF THE INVENTION

1. Field of the Invention

The present invention generally relates to project planning engines and more particularly to an improved planning engine which automatically monitors the status of tasks being performed by resources.

2. Description of the Related Art

Today's complex projects often have large design teams with complex methodologies and tools. Each tool may perform a specific task within the design flow. Teams may range from a few individuals on up to the hundreds. The need to control and track these activities have become a major focus within corporations today. The current method involves a graphical entry tool that allows the user to enter start and end dates and to link activities together, and to list the required resource (person) for the task.

Another software execution tool then uses an e-mail system to send out reminder notes to the resource (person) as to the task that needs to be completed and the time frame it needs to be accomplished during. It allows the resource (person) who has the task completion responsibility to enter into the system when the task is completed. This can be overridden by the project manager and his delegates. Usually, a team will designate a Project Team Leader whose job description is gathering the status of the team, and ensuring that the project planner stays in sync with the activities.

Several flaws exist with this present system. First, it is difficult to gather the data and keep the plan on track with all the individuals and activities within the project. Also, one person's definition of complete, may be different from another. Another problem is that there is not a connection with the ongoing activities and the project planning tool. These methodologies may be custom or ASIC (application specific integrated circuit) methodologies, but each is a collection of tools whose sum of the total results in a functional chip. The actual execution of these tools, and the project planning are conventionally only connected to a limited extent. Once again, the designers and Project Team Leader must factor these tasks/resources into the global plan. Another major flaw is that often the individual designers are not fully integrated into the project. Except for the status between the designer (resource and the Project Team Leader), the individual designers do not have direct update access to the plan. With the conventional systems, having all the designers accessing the project plan would most likely lead to chaos, and error.

SUMMARY OF THE INVENTION

In view of the foregoing and other problems, disadvantages, and drawbacks of the conventional planning engines, the present invention has been devised, and it is an object of the present invention to provide a structure and method for an improved planning engine.

In order to attain the object(s) suggested above, there is provided, according to one aspect of the invention, a method of coordinating resources to complete a design project. The method identifies tasks that must be finished to complete the design project based on design data. The invention assigns tasks to a plurality of resources and prioritizes the tasks based on dependency between the tasks to create a project plan. Next, the invention stores the project plan and the design data in a database. The invention automatically notifies the resources of corresponding task responsibilities and associated due dates based on the project plan through the use of encryption keys. The invention controls access to the design data through the use of the encryption keys assigned to the resources. The invention automatically monitors work being performed on the tasks through a computerized network and automatically notifies a project team leader of task completion status, overdue tasks, and tasks being ignored, based on the monitoring. The monitoring includes observing whether a resource is actively working on a task exclusively by observing network activity of the resource. The invention automatically schedules a meeting of all corresponding resources if a task becomes overdue. Further, the invention produces periodic status reports based on the monitoring. The invention automatically notifies the resources of additional tasks as prerequisite tasks are completed. The invention automatically searches for additional resources for tasks that are overdue. The monitoring process includes a polling function. With the invention, the project planner and database/tools 142, the design data 125, the designers 115–118, and the design tools 126 are fully integrated into a cohesive and pervasive whole 110. When being assigned a task, each user is provided with keys of that allow access to in the necessary tools. The keys allow the invention to track the progress of each task by utilizing the time parameters within each of the keys. Therefore, the invention controls access to the tools and assigns tasks through use of keys. The result is that the project planer 142 is fully integrated into the actual design tasks without the need of manual intervention. Changes in schedule can occur in a real time manner. Work completing early can be detected, and the next tasks launched and vice versa (the overdue task is visible). In addition, tasks being ignored are immediately flagged, and proper attention can be applied to the problem- In this manner, a higher probability of success can occur.

BRIEF DESCRIPTION OF THE DRAWINGS

The foregoing and other objects, aspects and advantages will be better understood from the following detailed description of a preferred embodiment(s) of the invention with reference to the drawings, in which.

DETAILED DESCRIPTION OF PREFERRED EMBODIMENTS OF THE INVENTION

The invention, which is sometimes referred to herein as the Pervasive Proactive Project Planner (PPPP) fully integrates the project planning tool fully into the design methodology. With the invention, the project planner, project planner database/tool, the data, the designers, and the design tools are fully integrated into a cohesive and pervasive whole. The PPPP enables, tracks, alerts, and controls, with full automation, the design methodology.

Figure 1:
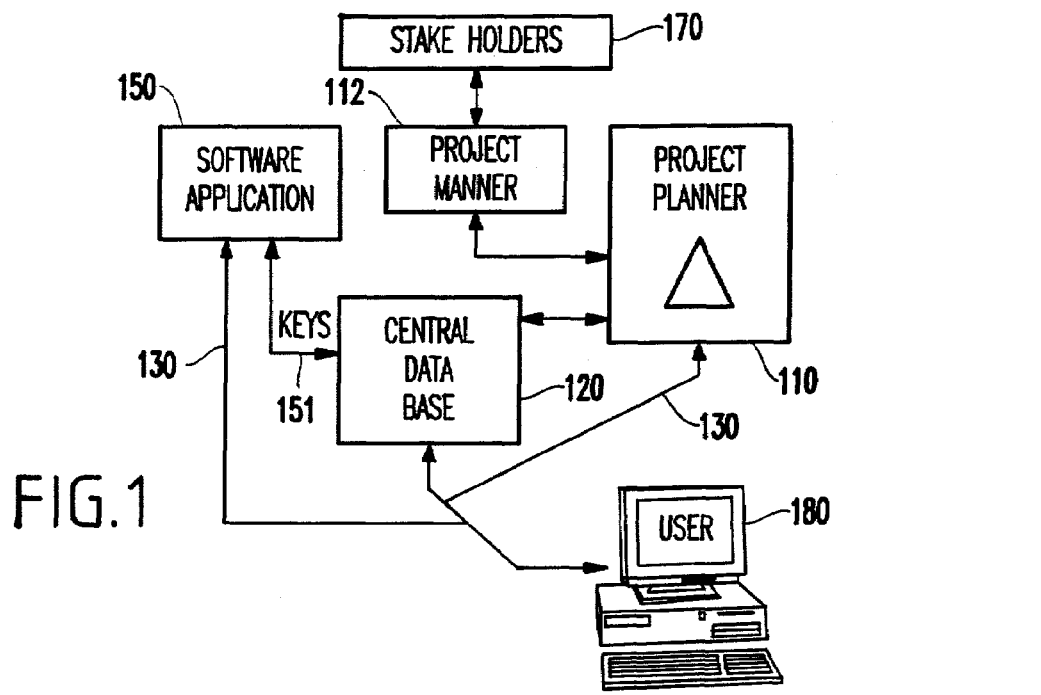
FIG. 1 is a schematic diagram of a system embodiment of the invention.

FIG. 1 illustrates an overall system diagram using the invention. More specifically, FIG. 1 shows the inventive project planner as item 110. A central database is shown as item 120. A user 180 provides input to the project planner 110 and the central database 120. Many conventional software applications 150 can be utilized with the invention, such as timing control, test generation, simulation, or other design software tools that link software design and the data. For example, the software application 150 can access the central database 120 using keys 151. The Project Manager 112 acts at the direction of the stakeholders 170 (who have requested the project) to execute the inventive project planner 112. With the invention, all functions are coordinated through the network 130. The detailed operation of the various functions shown in FIG. 1 are discussed in greater detail with respect to FIG. 2 below.

Figure 2:
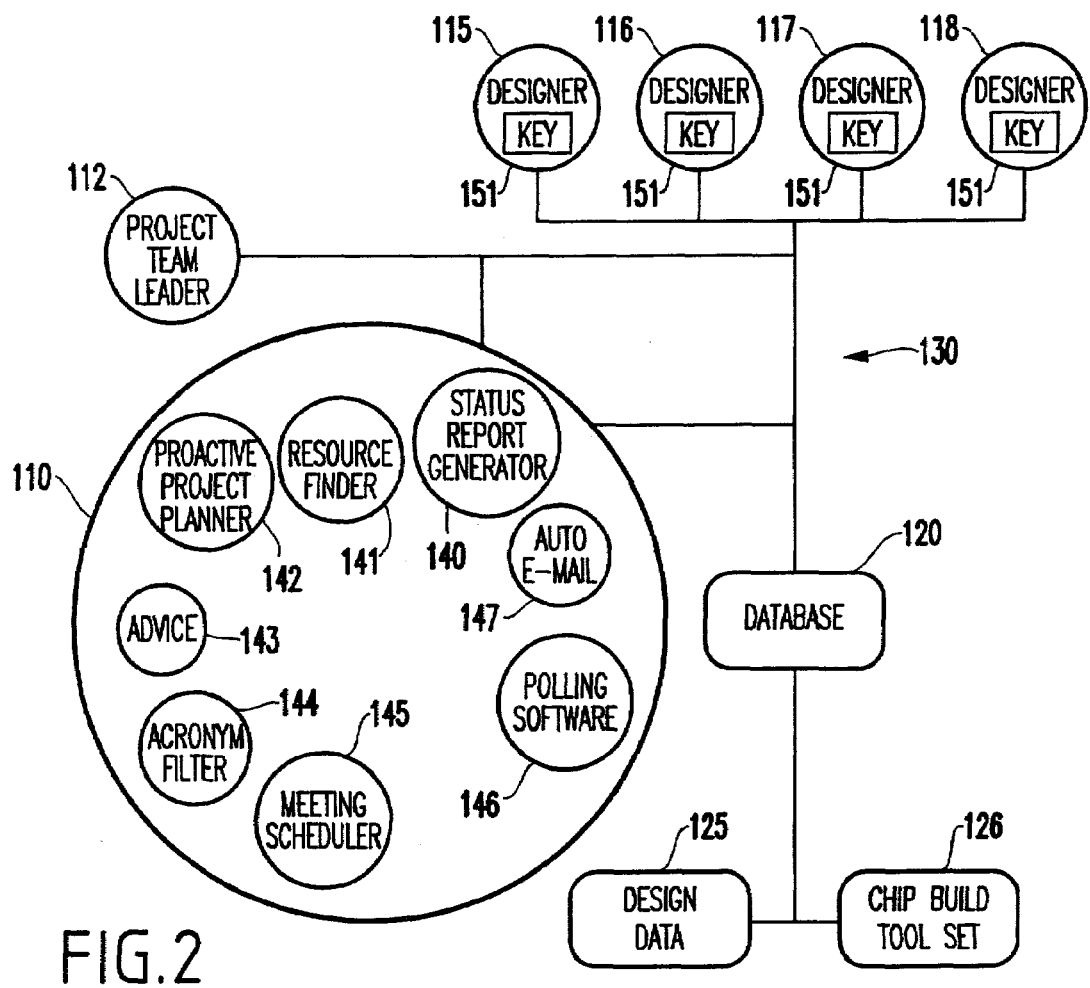
FIG. 2 is a schematic diagram of a system embodiment of the invention.

As shown in FIG. 2, the invention PPPP 110 includes a proactive project planner 142 that sends notices through a computer network 130 (local area network (LAN), wide area network (WAN), etc.) as to whether the task is on time and estimates on completion time. System warnings and response mechanisms that require task leader responses are included in this notice. Task leader 112 responses are monitored by the system and information is fed back to the project Manager.

Daily status reports are generated and distributed by the report generator 140 to all core members of team 115–118. Completion target date, project completion date and other useful information are also sent out to the team 115–118 within the encryption keys 151. Helpful suggestions on how to reduce the total cycle time (based on analysis of the current data) is provided to the team 115–118 in the reports. With the invention, if a task is completed sooner than expected, then the team members can be reassigned to another task. The change in assignment can be done manually or automatically. If the reassignment is done automatically, the invention provides the keys 151 to the team member at an earlier time than they would otherwise receive the keys.

The invention sends notes (e-mails) automatically 147 to team members 115–118 congratulating them on the completion of their task and asking for feedback on future improvements of the project.

Polling software 146 in the PPPP 110, automatically determines how much of a project task is completed, avoiding the need to make the project lead 112 stop his work to fill out a form. The invention 110 maintains the status of all project tasks. The polling software 146 also tracks how much time is spent by each developer 115–118 doing his work. If the developer/designer 115–118 logs on and does nothing for a period of time (based on document changes, compilation runs, tool usage, sensed over the network etc.), the invention does not count this time as working on the project task. Therefore, the PPPP 110 through the polling software 146 actually monitors through the network the hours and minutes that a designer devotes to actively working on a particular project task (in real time), not merely the amount of time a file is opened by a designer. This feature is useful in tracking specific expenses of work done on projects. This expense is often hard to track manually through the network because of multiple projects taking place at one time. To the contrary, with the polling feature, the project manager has automatically produced, up to the minute reports on the amount of time that his team is spending on a specific task.

Figure 5:
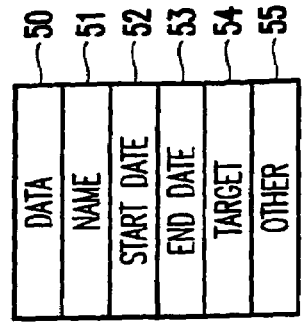
FIG. 5 is a schematic diagram of an encryption key.

In addition, the polling software 146 utilizes time parameters that are contained within each of the keys. FIG. 5 conceptually illustrates one of the keys 151 in greater detail. Each key 151 includes data 50, the team members name 51, the start date of a task 52, the end date of the task 53, and the tool or resource (target) to which the key provides access 54. In addition, the key can include other information 55 depending upon the specific application. Therefore, the key only allows the team member access to the target for a limited period of time The polling software utilizes this information to track the progress of each task. In addition, the polling software can modify the keys. Thus, if a task regularly takes longer or shorter than expected, the difference between the start date 52 and the end date 53 is changed by the polling software.

In addition, by storing feedback, etc. in an advice database 143, the invention polls, stores and recommends project tasks that are the most successful. Therefore, if a current method being tried by the task leader has failed every time it was tried before, the database would warn the task leader of previous failures and give failure analysis. For example, each tool, application, etc. may contain helpful notes regarding the successfulness of the operation, before it is used and may even contain a recommendation to the user to try something different first, because of the higher likelihood of success with the alternative tool, application, etc.

The PPPP 110 also includes a proactive additional resource finder 141. This allows the PPPP 110 to search the network 130 for additional resources to complete the task automatically if the project task is overdue and additional internal resources are not available. For example, the resource finder 141 will automatically send out e-mail to known resources requesting assistance when a project become overdue (more than a predetermined period past the proposed due date contained in the key 151).

The PPPP 110 includes a term and acronym filter 144 that comprises a database of on-line help to give a high level overview and modeling capability. If a particular task description uses unfamiliar terms and acronyms, then this would be available to provide assistance.

The PPPP 110 has an automatic meeting scheduler 145. Besides checking all team member's availability for a requested meeting, the meeting scheduler 145 also automatically schedules a meeting when the project has fallen behind by a certain amount. The meeting scheduler 145 would be supplied with a list of parties who would automatically be invited, depending upon the task that is overdue, as well as a prescribed agenda that may include, for example, reports from each team member regarding task status/task problems.

A database 120 links the project planner system 110, the project planner 142, the designers 115, the design data 125, and the design entry/chip build tool set 126.

The PPPP database 120 is a traffic control unit that keeps tracks of when data is checked out or in by the various designers 115–118. The PPPP database 120 has new functions not existing in prior centralized databases.

For example, new to the database 120 is an enhanced link to the project planning database 142. These databases share key information in the form of task/data/resource tags along the encryption keys 151. Each task/resource and time domain is controlled by the project planning database 142. Before design is allowed to occur, the project planner 142 along with the designers 115–118 are required to enter into the project planning database all design data, designs, tools, and tasks. The project planner database 142 is modified to include the type of tools for a task to be included along with the most appropriate resource (person) 115–118 for the task and the duration of the task. In order to properly match the resource with the task, the invention maintains resource profiles (qualifications) of each of the resources. In this way, the invention can track whether a resource is receiving tasks for which the designer (resource) is qualified.

In addition, with the invention all tasks identify the design data 125 as a resource. So when a task is entered in the project planner 142, the information entered includes the task, the person (resource) 115–118, the data source, and optional data destination, the design tools used 125, 126, for the task along with normal start, end and any task that may gate the start of the task, along with any task that may be gated by this task. A first task "gates" a second task if the first task is a prerequisite to (must be completed before) the second task. Thus, the project planner tool 142 creates a data structure that includes the complete function (resource, task, time, tools, etc.) along with a valid encrypted set of keys.

The database 120 incorporates the project planner 142 data structure to allow checking out and checking in of data. When a designer 115–118 is ready to execute a task, the designer 115–118 identifies the task to the central database 120, and the central database 120 searches the project planner 142 data structure to determine whether or not the task exists, and whether a set of encrypted keys exist. If the task exists (i.e., has been defined within the project planner database 142), and a valid set of keys exists, then the designer 115–118 is given a copy of the design data 125 along with a valid key. As a result of checking out the data, the central database 120 marks the project planner data structure 142 for that task as "active" and begins monitoring through the polling function 146, as discussed above. Thus, the project planner 142 is automatically notified of an ongoing task.

If the designer requires a design system tool 126 to perform a function of the design data 125, the designer provides to the tool 126 both the data, and the encryption key. To activate, the tool 126 acquires a complement active key 152 (lock) from the central database 120. The complement key 152 is one that complements the key provided by the design data (e.g., the lock that requires the designer's key 151). If the complement key does not exist, the designer is notified that an unplanned task is being attempted to the design data. In addition, the project planner is automatically notified.

The invention allocates the tools/tasks for any design data. Once the designer has completed the task, the data is checked back into the central database 120. Once again, the designers must have a valid key in order to check in the data/results into the database. The central project planner 142 automatically updates the project plan data structure to mark the units return and completion. The project plan database 142 updates itself based on the completed task. More specifically, besides marking the task complete, the project plan database unlocks (by creating valid keys) any tasks that were gated by the just completed task. Though the automatic e-mail function 147, the project planner 142 is notified, along with all designers that were being gated, of the completed task. All unlocked tasks then can request from the central database the required data and keys. This process repeats as the project moves to completion.

Figure 3:
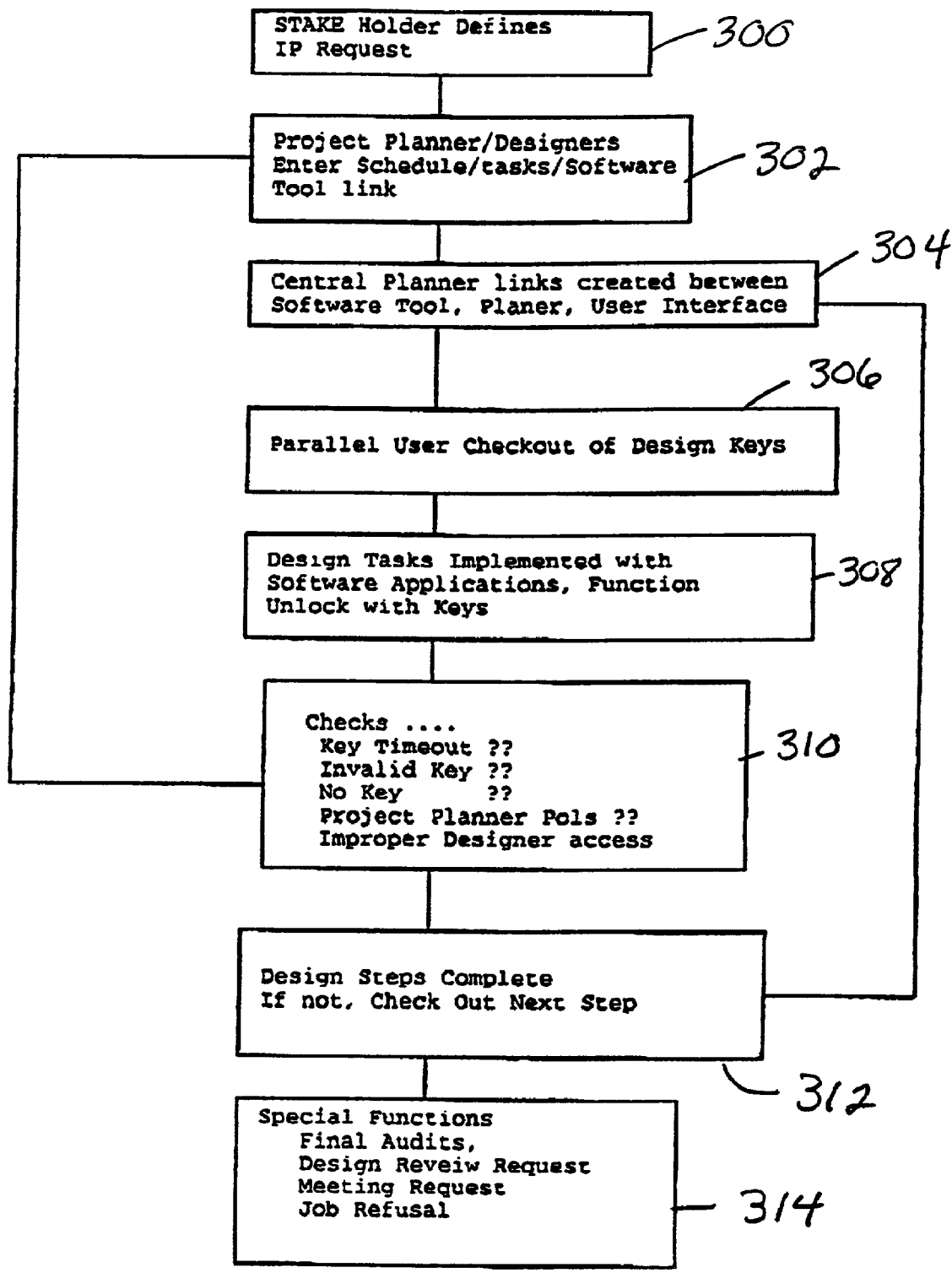
FIG. 3 is a flow diagram illustrating a preferred method of the invention.

FIG. 3 shows the invention in flowchart form. The flowchart begins at item 300 where the stakeholder 170 defines a project request. The Project Manager 112 operates the project planner 110 to schedule tasks among the designers 115–118, as discussed above (as shown in item 302). In item 304, the central planer create links between the software tool, the planner, and the user interface. The user 180 can perform parallel options while the project is being completed 306. Then, in item 308, the various tasks are completed by the designers 115–118 using the databases and keys, as discussed above. Item 310 illustrates the process of determining whether a designer has a valid key. The key must have been issued within a prescribed time (the key must not be timed out). If the key is invalid, the project planner is notified of the improper design access.

In item 312, the process loops back as long as there are additional tasks to be completed. Item 314 represents the various special functions that the invention can achieve. More specifically, the invention can produce final audits indicating the efficiency and resources used of the different corporate departments who contributed to completing a project. The invention allows the user or stakeholder to request to review the design that any point in the process to make sure the design complies with their goals. As mentioned above, the meeting scheduler 145 can automatically (or when prompted) schedule a meeting. In addition, the project team leader/manager 112 can decide to refuse a job based on predetermined criteria.

Figure 4:
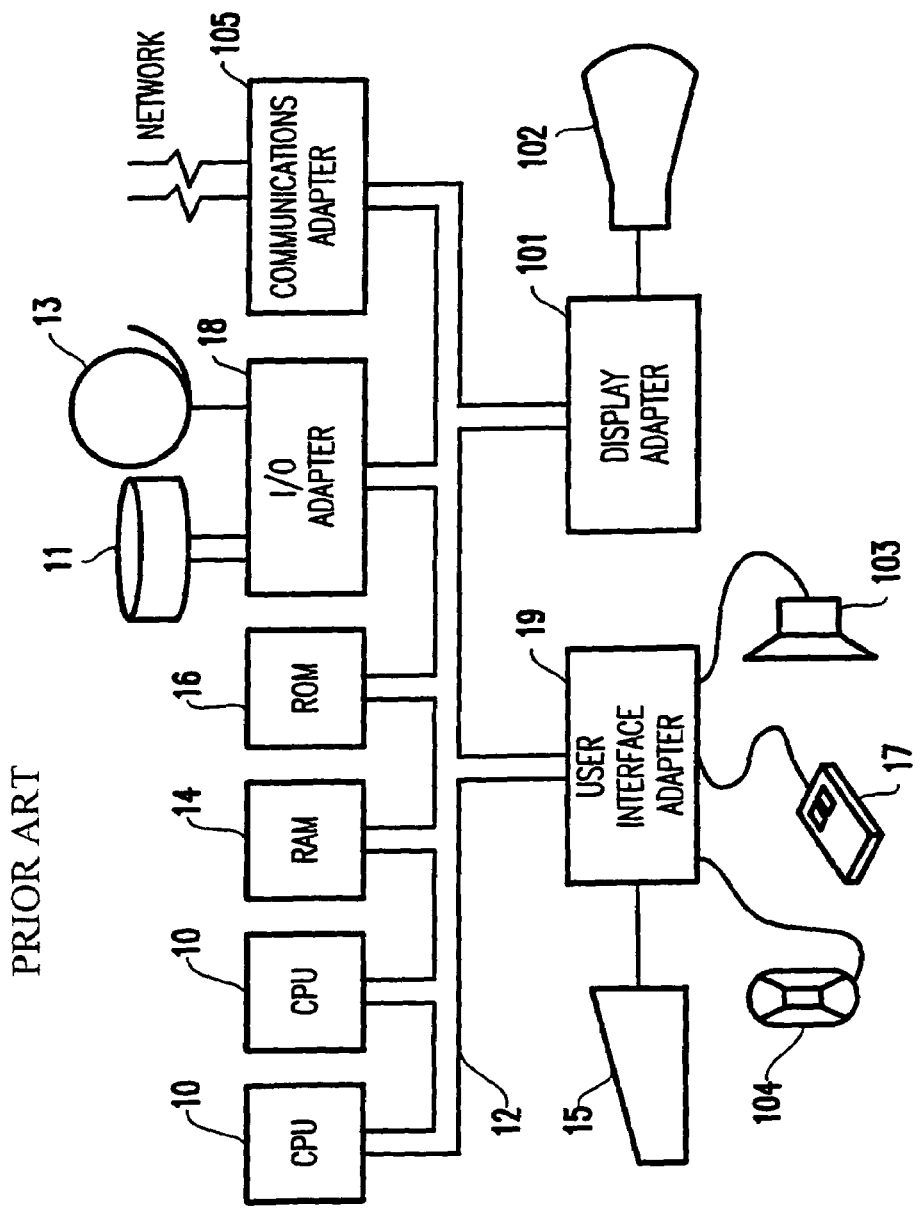
FIG. 4 is a hardware diagram of a computer system used with the invention.

A representative hardware environment for practicing the present invention is depicted in FIG. 4, which illustrates a typical hardware configuration of an information handling/computer system in accordance with the subject invention, having at least one processor or central processing unit (CPU) 10. CPUs 10 are interconnected via system bus 12 to random access memory (RAM) 14, read-only memory (ROM) 16, an input/output (I/O) adapter 18 for connecting peripheral devices, such as disk units 11 and tape drives 13, to bus 12, user interface adapter 19 for connecting keyboard 15, mouse 17, speaker 103, microphone 104, and/or other user interface devices such as touch screen devices (not shown) to bus 12, communication adapter 105 for connecting the information handling system to a data processing network, and display adapter 101 for connecting bus 12 to display device 102. A program storage device readable by the disk or tape units, is used to load the instructions which operate on the inventive system which is loaded onto the computer system.

Several key features exist with this new integrated PPPP environment 110. With the invention, the project planner and database/tools 142, the design data 125, the designers 115–118, and the design tools 126 are fully integrated into a cohesive and pervasive whole 110. When being assigned a task, each user is provided with keys of that allow access to in the necessary tools. The keys allow the invention to track the progress of each task by utilizing the time parameters within each of the keys. Therefore, the invention controls access to the tools and 10 assigns tasks through use of keys. The result is that the project planer 142 is fully integrated into the actual design tasks without the need of manual intervention. Changes in schedule can occur in a real time manner. Work completing early can be detected, and the next tasks launched and vice versa (the overdue task is visible). In addition, tasks being ignored are immediately flagged, and proper attention can be applied to the problem. In this manner, a higher probability of success can occur.

While the invention has been described in terms of preferred embodiments, those skilled in the art recognize that the invention can be practiced with modification within the spirit and scope of the appended claims.

What is claimed is:

1. A method of coordinating resources to complete a design project, said method comprising:

identifying tasks, comprising at least a first task and a second task, that must be finished to complete said design project based on design data;

receiving information about said tasks that must be finished in order to complete said design project, wherein said information comprises, for each one of said tasks, an appropriate resource, a data source, at least one design tool and a duration;

prioritizing said tasks based on dependency between said tasks to create a design project plan, wherein said first task is a prerequisite for said second task;

creating an encryption key for each one of said tasks,
  wherein said encryption key comprises a name of said appropriate resource for said one of said task, a start date for said one of said tasks, an end date for said one of said tasks, said data source for said one of said tasks and said at least one design tool for said one of said tasks,
  wherein said encryption key for said one of said tasks is used to automatically notify said appropriate resource of task responsibilities and allows access by said appropriate resource to said data source and said at least one design tool from said start date to said end date, and
  wherein creation of said encryption key for said second task is gated until completion of said first task;

automatically monitoring work being performed on said tasks through a computerized network, wherein said monitoring comprises using a polling function to observe network activity of a resource to determine whether said resource is actively working on a task; and automatically notifying a project team leader of task completion status, overdue tasks, and tasks being ignored, based on said monitoring.

2. The method in claim 1, further comprising automatically scheduling a meeting of all corresponding resources if a task becomes overdue.

3. The method in claim 1, further comprising producing periodic status reports based on said monitoring.

4. The method in claim 1, further comprising automatically notifying said resources of additional tasks as prerequisite tasks are completed.

5. The method in claim 1, further comprising automatically searching for additional resources for tasks that are overdue.

6. A method of coordinating resources to complete a design project, said method comprising:

identifying tasks, comprising at least a first task and a second task, that must be finished to complete said design project based on design data;

receiving information about said tasks, wherein said information comprises, for each one of said tasks, an appropriate resource, a data source, at least one design tool and a duration;

prioritizing said tasks based on dependency between said tasks to create a design project plan, wherein said first task is a prerequisite for said second task;

creating an encryption key for each one of said tasks,
  wherein said encryption key comprises a name of said appropriate resource for said one of said task, a start date for said one of said tasks, an end date for said one of said tasks, said data source for said one of said tasks and said at least one design tool for said one of said tasks,
  wherein said encryption key for said one of said tasks is used to automatically notify said appropriate resource of task responsibilities and allows access by said appropriate resource to said data source and said at least one design tool from said start date to said end date, and
  wherein creation of said encryption key for said second task is gated until completion of said first task;

storing said design project plan and said design data in a database;

automatically monitoring work being performed on said tasks through a computerized network, wherein said monitoring comprises using a polling function to observe whether a resource is actively working on a task; and automatically notifying a project team leader of task completion status, overdue tasks, and tasks being ignored, based on said monitoring.

7. The method in claim 6, wherein said monitoring includes observing whether said resource is actively working on a said task exclusively by observing network activity of said resource.

8. The method in claim 6, further comprising automatically scheduling a meeting of all corresponding resources if a task becomes overdue.

9. The method in claim 6, further comprising producing periodic status reports based on said monitoring.

10. The method in claim 6, further comprising automatically notifying said resources of additional tasks as prerequisite tasks are completed.

11. The method in claim 6, further comprising automatically searching for additional resources for tasks that are overdue.

12. A program storage device readable by machine, tangibly embodying a program of instructions executable by the machine to perform a method for coordinating resources to complete a design project, said method comprising:

identifying tasks, comprising at least a first task and a second task, that must be finished to complete said design project based on design data;

receiving information about said tasks, wherein said information comprises, for each one of said tasks, an appropriate resource, a data source, at least one design tool and a duration;

prioritizing said tasks based on dependency between said tasks to create a design project plan, wherein said first task is a prerequisite for said second task;

creating an encryption key for each one of said tasks,
  wherein said encryption key comprises a name of said appropriate resource for said one of said task, a start date for said one of said tasks, an end date for said one of said tasks, said data source for said one of said tasks and said at least one design tool for said one of said tasks,
  wherein said encryption key for said one of said tasks is used to automatically notify said appropriate resource of task responsibilities and allows access by said appropriate resource to said data source and said at least one design tool from said start date to said end date, and
  wherein creation of said encryption key for said second task is gated until completion of said first task;

automatically monitoring work being performed on said tasks through a computerized network, wherein said monitoring comprises using a polling function to observe whether a resource is actively working on a task; and automatically notifying a project team leader of task completion status, overdue tasks, and tasks being ignored, based on said monitoring.

13. The program storage device in claim 12, wherein said monitoring includes observing whether a said resource is actively working on said task exclusively by observing network activity of said resource.

14. The program storage device in claim 12, wherein said method further comprises automatically scheduling a meeting of all corresponding resources if a task becomes overdue.

15. The program storage device in claim 12, wherein said method further comprises producing periodic status reports based on said monitoring.

16. The program storage device in claim 12, wherein said method further comprises automatically notifying said resources of additional tasks as prerequisite tasks are completed.

17. The program storage device in claim 12, wherein said method further comprises automatically searching for additional resources for tasks that are overdue.

* * * * *